US011679884B2

(12) United States Patent
Hacker et al.

(10) Patent No.: US 11,679,884 B2
(45) Date of Patent: Jun. 20, 2023

(54) AIRCRAFT SEATING MODULE (71) Applicant: The NORDAM Group LLC, Tulsa, OK (US)

(72) Inventors: Mark Robert Hacker, Little Horwood (GB); Carlos Roberto Flores, Tulsa, OK (US); Christopher Ervin Erickson, Owasso, OK (US)

(73) Assignee: The NORDAM Group LLC, Tulsa, OK (US)

( * ) Notice: Subject to any disclaimer, the term of this patent is extended or adjusted under 35 U.S.C. 154(b) by 68 days.

(21) Appl. No.: 17/531,719

(22) Filed: Nov. 20, 2021

(65) Prior Publication Data
US 2022/0169390 A1 Jun. 2, 2022

Related U.S. Application Data (60) Provisional application No. 63/119,695, filed on Dec. 1, 2020.

(51) Int. Cl.
B64D 11/06 (2006.01)
B64C 1/20 (2006.01)

(52) U.S. Cl.
CPC ............ B64D 11/0696 (2013.01); B64C 1/20 (2013.01); B64D 11/0602 (2014.12); B64D 11/0606 (2014.12); B64D 11/0641 (2014.12); B64D 11/0643 (2014.12); B64D 11/0601 (2014.12)

(58) Field of Classification Search
CPC .... B64D 11/0696; B64D 11/0602; B64C 1/20
See application file for complete search history.

(56) References Cited

U.S. PATENT DOCUMENTS

| 4,936,527 | A | 6/1990 | Gorges |
| 5,284,379 | A | 2/1994 | Arnold et al. |
| 5,762,296 | A | 6/1998 | Gilbert |
| 6,669,143 | B1 | 12/2003 | Johnson |
| 6,739,552 | B2 | 5/2004 | Sankrithi et al. |
| 8,393,574 | B2 | 3/2013 | Kismarton |
| 8,544,796 | B2 | 10/2013 | Pozzi et al. |
| 9,302,774 | B2 | 4/2016 | Henshaw |
| 9,604,725 | B2 | 3/2017 | Cecinas et al. |
| 9,828,100 | B2 | 11/2017 | Wyss |
| 9,919,803 | B2 | 3/2018 | Pozzi et al. |
| 2006/0097553 | A1 | 5/2006 | Spurlock et al. |
| 2009/0084925 | A1 | 4/2009 | Kismarton |
| 2009/0283636 | A1* | 11/2009 | Saint-Jalmes .... B64D 11/00154 244/118.5 |
| 2011/0148173 | A1 | 6/2011 | Westerlink et al. |
| 2011/0233337 | A1* | 9/2011 | Pozzi ........................ B64C 1/18 29/428 |

(Continued)

Primary Examiner — Timothy D Collins
Assistant Examiner — Brendan Kroger Schneider
(74) Attorney, Agent, or Firm — Francis L. Conte (57) ABSTRACT An aircraft seating module (20) includes a seating mount (26) having a horizontal mounting rail (28) integrally joined to a vertical mounting post (30) at an adjoining elbow (32). The rail (28) includes a mounting boss (34) longitudinally spaced from the post (30) for attachment to an aircraft cabin seat track (18). Both the rail (28) and post (30) include mounting holes (38) for attaching a passenger seat (22) and appended furniture (24) directly to the seating mount (26) and in turn indirectly to the seat track (18) in the cabin floor (12).

20 Claims, 8 Drawing Sheets (56) References Cited

U.S. PATENT DOCUMENTS

| | | |
|---|---|---|
| 2014/0232153 A1 | 8/2014 | Bell et al. |
| 2015/0175266 A1 | 6/2015 | Ferry et al. |
| 2015/0259067 A1 | 9/2015 | Saint-James et al. |
| 2016/0083098 A1 | 3/2016 | Lucas et al. |
| 2018/0215469 A1* | 8/2018 | Uriu ......................... B60N 2/22 |
| 2019/0077513 A1 | 3/2019 | Oleson |

* cited by examiner

AIRCRAFT SEATING MODULE

BACKGROUND OF THE INVENTION

The present invention relates generally to aircraft seating, and, more specifically, to mounting of aircraft seats in a passenger cabin of an aircraft.

A commercial passenger aircraft typically has one or two aisles extending the length of the aircraft passenger cabin along which are disposed multiple rows of passenger seats. The seats are typically larger and wider for the first class or business cabin than they are for the standard or economy cabin, with greater aisle separation in the former premium seats than in the latter economy seats for providing extra legroom, as well as for providing lay-down extension of the premium seats for allowing horizontal sleeping position for the passengers.

The seats are fixedly attached to the cabin floor in similar manners irrespective of seat class by affixing the corresponding seat legs to a pair of seat tracks securely mounted to the underlying cabin frame or beams which support the cabin floor. The seat tracks extend longitudinally along the cabin floorboards, and flush therewith, and include a row of keyhole slots configured for receiving a corresponding double-lug threaded stud fitting or fastener.

The double lugs of this fastener are inserted into the keyhole slots and slid halfway between two slots for retention under flanges, and then secured thereat by a corresponding circular washer or plunger sized to fit a matching retention seat. The threaded stud extends through the seat leg, and a retention nut on the stud clamps the washer in place to prevent movement of the stud fastener, and thereby secures the seat in position.

The legs of the various seats are sized and configured for withstanding all operational loads, due in most part to the weight of each passenger retained in the seat by the seat belt.

In addition to normal aircraft flight, the aircraft seats are designed to protect the passenger in survivable crash situations. Therefore, they have to be proven to be strong enough to maintain integrity for a so-called 16-times-gravity (16 g) dynamic crash event, such as running off the runway, heavy landing, or failure of the landing gear.

In-flight inertia loads for a typical passenger can reach 4 g forward, 2 g rear, 2 g side, 3 g up, and 4 g down; whereas during an emergency landing the inertia loads can be substantially higher like 16 g forward, 4 g rear, 4 g side, 8 g up, and 14 g down, all of which inertia loads must be safely carried through each passenger seat and seat legs and through the seat fasteners into the seat tracks.

The floor-mounted seat tracks are the primary structural element in the cabin. For aircraft level certification and structural compliance, seating products are only allowed to be attached to seat tracks, without additional attachment to the cabin or its sidewall or fuselage. Therefore, all the forces from the seat must be carried through or into the seat tracks, including the 16 g dynamic crash event.

There exist various conventional seating frames or adapters which attach to the seat tracks for providing floor-level attachment points for the seats. In the case of business and first class seats, the seats are larger in size than economy seats, and are typically more complex to allow substantial inclination and lay-flat configurations for sleeping. Such premium seats typically further include appended furniture and associated privacy partitions, all of which further increase weight and loads which must still be carried through the same seat tracks provided in the aircraft for the smaller and lighter economy seats as well.

The premium-class seating environment has evolved to offer seating modules or pods with privacy, entertainment, workspace, and comfort. This evolution has driven seating manufacturing companies to design pods that might utilize a fixed, heavy, and large attachment plate at the base of the seat and furniture which baseplate then attaches to the aircraft seat tracks.

As airlines seek to utilize single-aisle aircraft on longer routes traditionally serviced by twin-aisle aircraft, space available for such seating pods is limited, and conventional seat pod designs are inadequate due to excessive size and weight.

Accordingly, it is desired to provide an improved aircraft seating module for more efficiently carrying weight and loads therefrom into conventional seat tracks in the aircraft cabin floor.

BRIEF DESCRIPTION OF THE INVENTION

An aircraft seating module includes a seating mount having a horizontal mounting rail integrally joined to a vertical mounting post at an adjoining elbow. The rail includes a mounting boss longitudinally spaced from the post for attachment to the aircraft cabin seat track. Both the rail and post include a plurality of mounting holes for attaching the passenger seat and appended furniture directly to the seating mount and in turn indirectly to the seat track in the cabin floor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
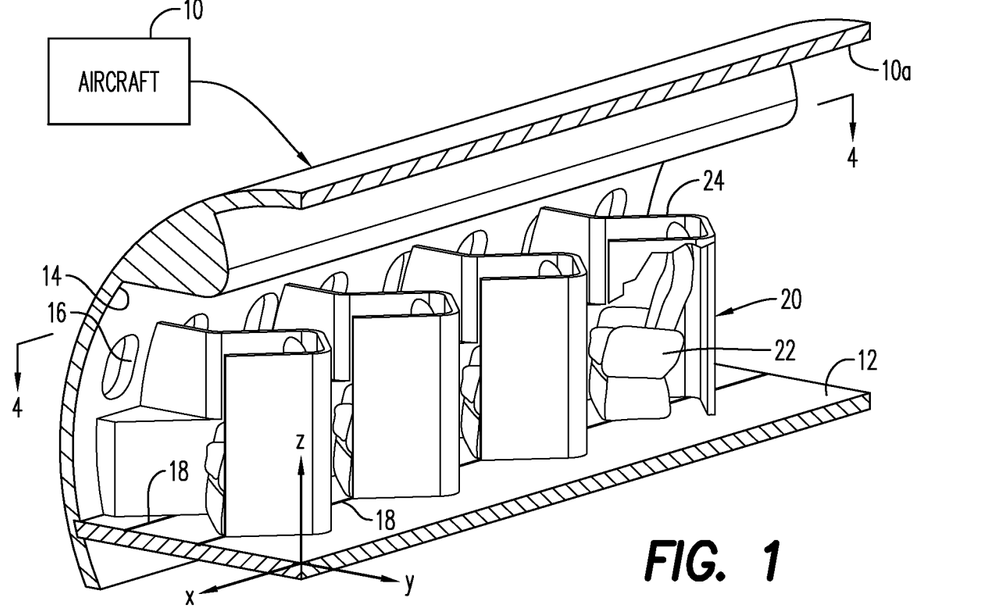
FIG. 1 is an isometric sectional view of a portion of an aircraft cabin having a pair of floor-mounted seat tracks to which is joined an improved aircraft seating module including a seating mount supporting a passenger seat.

FIG. 1 shows a section of an aircraft 10 having a passenger cabin 10a including a floor 12 and surrounding sidewall 14, with a row of windows 16 spaced apart longitudinally along the longitudinal X-axis of the aircraft. Transverse to that longitudinal X-axis is a Y-axis extending across the width of the aircraft, and extending vertically from the floor 12 is the Z-axis.

The aircraft 10, itself, may have any conventional configuration, including one or more aisles and passenger cabins separated by revenue classes, and powered by engines for take-off, flight, and landing operations.

Fixedly mounted in the aircraft floor 12 are a pair of longitudinal seat tracks 18, typically referred to as aircraft-style flanged H-track, which can have any conventional configuration including a row of keyhole slots for securely positioning and mounting the various aircraft seats along various aisles as required by each aircraft cabin configuration.

Figure 2:
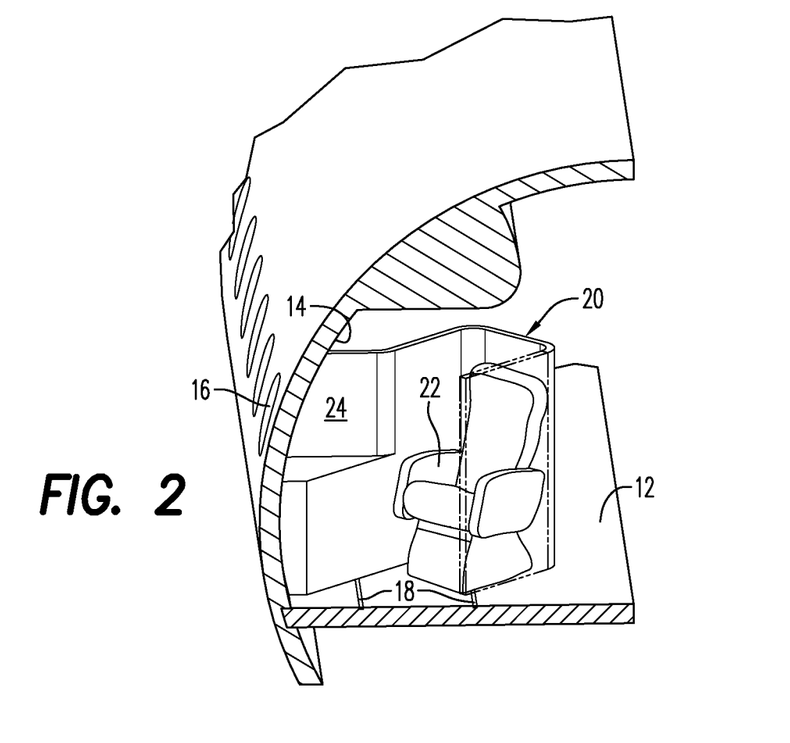
FIG. 2 is an isometric view of an exemplary seating module shown in FIG. 1 including an exemplary business-class passenger seat and attendant furniture.

FIGS. 1 and 2 illustrate a row of exemplary aircraft seating pods or modules 20 configured for use in the premium class cabins of a passenger aircraft along one or more passenger aisles. Each module 20 includes an aircraft passenger seat 22 and appended furniture 24 supported on a corresponding pair of the seat tracks 18 in the aircraft cabin floor 12.

Economy seats are relatively compact and lightweight and can be readily mounted to the seat tracks through two leg frames and corresponding fasteners.

In contrast, however, the typical premium seat 22 is larger and more complex for additionally having the lay-flat sleeping position, and is surrounded by the corresponding furniture 24, and collectively form the seating module 20 which requires substantially more floor area than several economy seats. This large seat module 20 therefore substantially increases the collective weight thereof and the associated loads, especially including the 16 g crash-event loads described above for meeting required safety specifications. And, those crash-event loads must necessarily be carried through the conventional seat tracks 18 provided in the cabin floor 12.

The attendant furniture 24 typically includes a privacy partition or wall surrounding the sides and back of the seat 22, with integrated shelves, trays, and storage for associated premium features like audio and visual equipment and storage for personal items and bedding. As used herein, the term furniture 24 includes any attendant structural feature associated with each premium seat which must necessarily be supported on the cabin floor during operation of the aircraft.

Accordingly, the larger premium seat 22 and its attendant furniture 24 require larger surface area in the aircraft corresponding with several economy-class seats, and have correspondingly greater weight, which in turn substantially increases the operational loads which must be suitably supported by the cabin floor.

In particular, design of the relatively large and heavy seating module 20 requires substantial structural strength to safely withstand the 16 g dynamic crash event required by Government regulations, yet any increase in module weight decreases the overall passenger-carrying capability of the aircraft in a design trade-off.

Figure 3:
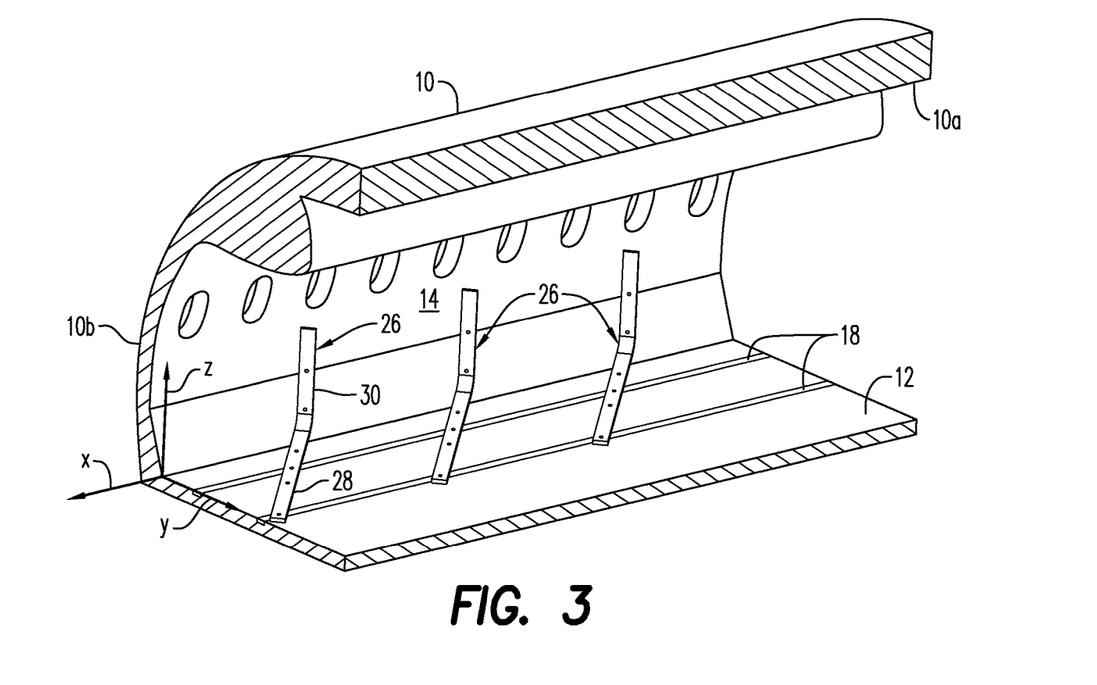
FIG. 3 is an isometric view of the aircraft passenger cabin shown in FIG. 1, with the seating modules removed in most part to show an exemplary embodiment of the seating mounts affixed to the seat tracks in the cabin floor.
Figure 4:
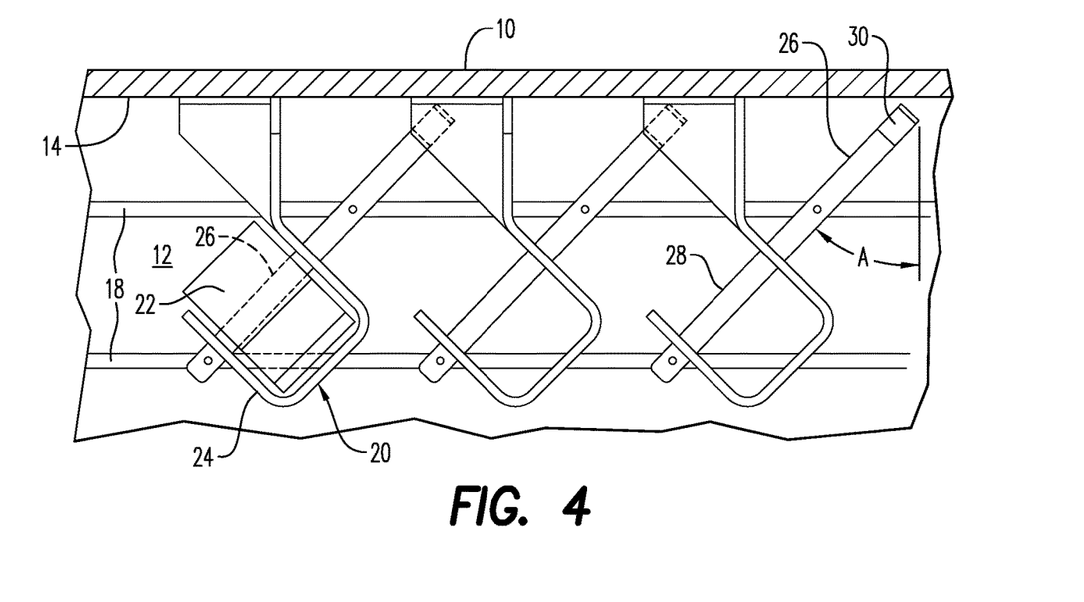
FIG. 4 is a top view of the row of seating modules shown in FIG. 1, with the seats removed to show the attendant furniture and underlying seating mounts.

Accordingly, the improved seating module 20 initially shown in FIGS. 1 and 2 mounted in the aircraft cabin further includes a new and specially configured seating frame or mount 26 shown in isolation from the module in FIGS. 3 and 4.

The seating mount 26 provides new and improved Seat Attachment FramE (S.A.F.E. or simply SAFE) Technology in a custom designed internal bracket or adapter for interfacing and carrying all required three-dimensional seat loads in the aircraft including for seats arranged in various configurations in the different aircraft cabin sections, and especially useful for the larger premium-class seats, and any attendant furniture.

The seating mount 26 is designed to provide various attachment or mounting points not only at the floor, but also along the vertical sidewall level, but without direct attachment to the sidewall itself, or the surrounding aircraft fuselage.

The fuselage of the typical aircraft 10 includes a metal outer skin 10b attached to structural frames and stringers (not shown), which are themselves covered by the internal sidewall 14 that provides a decorative interior to the passenger cabin. The aircraft or airframe manufacturer typically provides the seat tracks 18 in the cabin floor 12 as the sole or only support for the various passenger seats provided in the aircraft, and it is undesirable to modify the aircraft structure itself for supporting seats to the cabin sidewall 14, including the internal frames and stringers found therein to which the sidewall is affixed.

Accordingly, one, or more, of the SAFE frames or mounts 26 shown in FIGS. 3 & 4 is preferentially integrated into the seating module 20 for mounting the seating module both on or at the cabin floor 12, as well as at an elevated sidewall level, although not attached to the sidewall, or internal frames, itself due to prohibition by corresponding aircraft installation regulations. In these figures, the seating mount 26 is disposed closely adjacent to the sidewall 14 on the inside of the cabin 10a, without any attachment to that sidewall.

Figure 5:
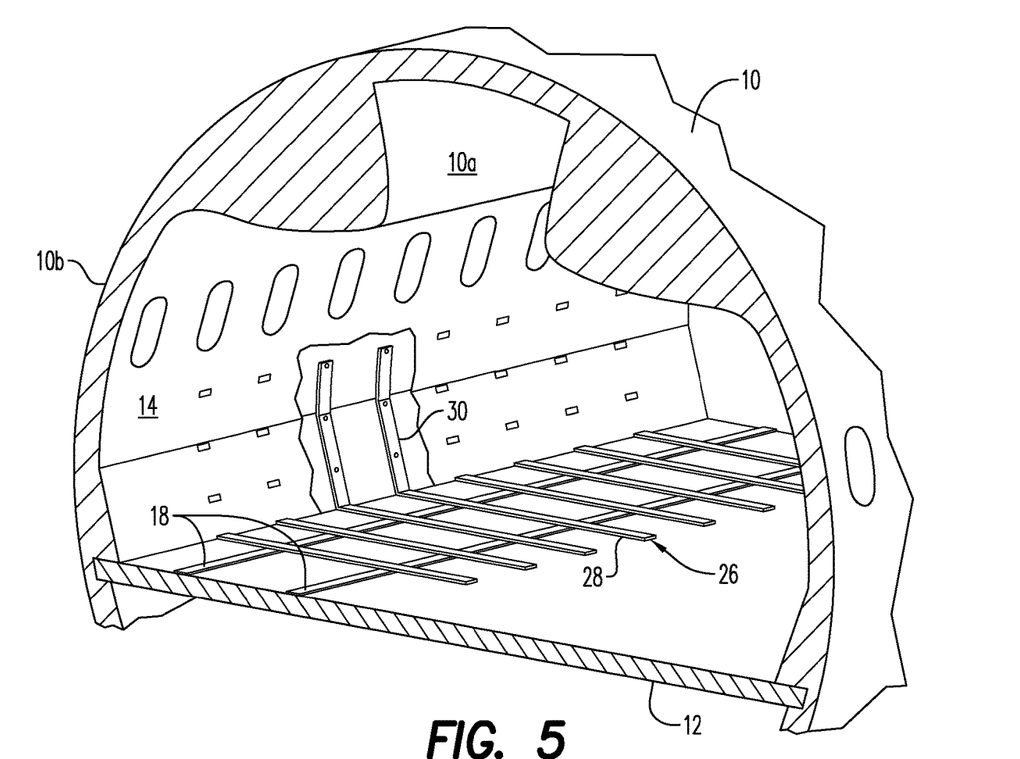
FIG. 5 is an isometric view of the exemplary passenger cabin shown in FIG. 3, with the seat mounts shown in another embodiment.

In FIG. 5, the seating mounts 26 can extend in part inside or within the cabin sidewall 14, yet again without attachment thereto, with suitable access holes through the sidewall for attachment to the seating module.

Figure 6:
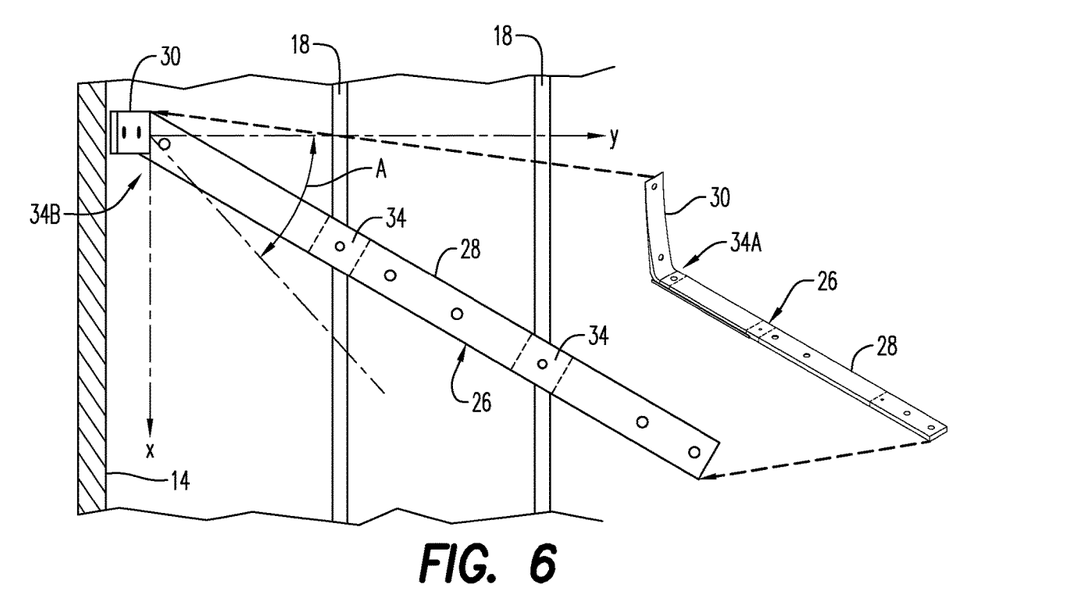
FIG. 6 is a top view of an exemplary seating mount affixed to two underlying seat tracks in the cabin floor to show an exemplary range of seating angles therefor.
Figures 7, 8:
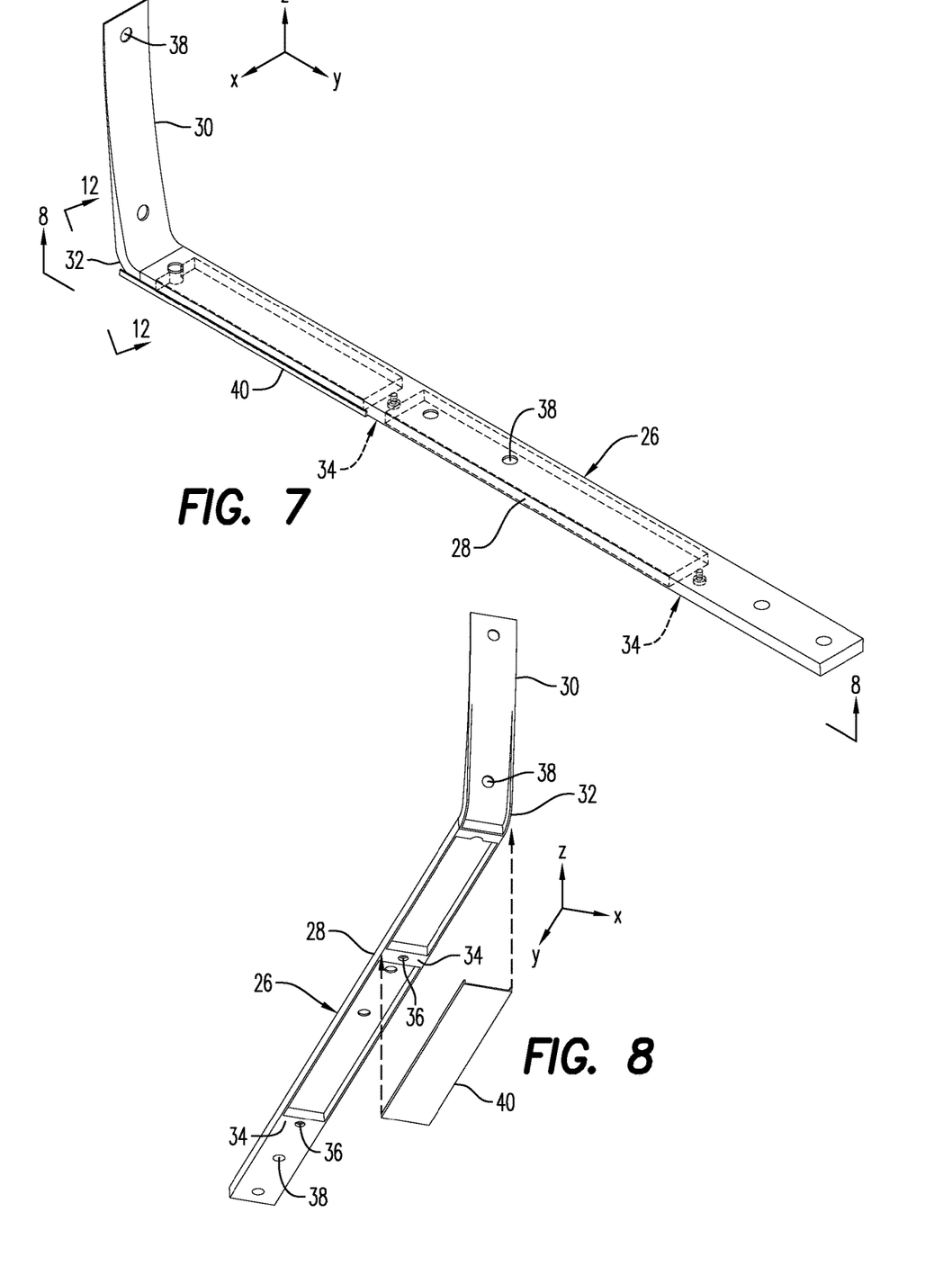
FIG. 7 is an isometric top view of an exemplary seating mount shown in isolation.
FIG. 8 is an isometric bottom view of the seating mount shown in FIG. 7, and taken along line 8-8.

FIGS. 6 and 7 show exemplary or basic features of the SAFE adapter or seating mount 26 in the form of an angled-shape brace or L-shaped bracket, like a hockey-stick shape, that enables seat attachment to the airframe in both the transverse X-Y-plane and additionally in the vertical Z-axis. The mount 26 has suitable floor-level attachment points and suitable sidewall-level attachment points. The mount can be carefully designed to handle the applied forces from various seating products, including the 16 g crash-event loads, and especially including torsion loads.

A basic example of the SAFE seating mount 26 is initially shown in top view in FIG. 7 and in bottom view in FIG. 8, and includes a horizontal floor mounting rail 28 integrally joined to a vertical sidewall mounting post 30 at an adjoining transition or joining elbow 32, which collectively form a generally right-angled structural brace.

The rail 28 and post 30 are elongate, slender, and thin as required to extend narrowly across the relevant dimensions or length of the seating module between required mounting points for minimizing weight, while providing sufficient strength custom-designed for withstanding expected or design operational loads which must be carried through the seating mount itself.

In the exemplary embodiment shown in FIGS. 7 and 8, the mounting rail 28 is as thin as practical, and therefore includes a locally enlarged mounting tab or boss 34 longitudinally spaced from the post 30 for direct attachment to the seat track 18. Since seats in an aircraft are typically mounted to a pair of the seat tracks 18, the seating mount 26 has a sufficient length to extend from the cabin sidewall 14 preferably over two of the parallel seat tracks 18 to terminate near the corresponding cabin aisle.

Accordingly, the mounting rail 28 preferably includes two of the mounting bosses 34 longitudinally spaced apart from each other and from the mounting post 30 at specific longitudinal positions for corresponding alignment with the pair of seat tracks 18 for corresponding attachment thereto. Each mounting boss 34 may include an aperture or hole 36 for receiving a suitable fastener for affixing the rail 28 directly to each of the two seat tracks 18.

Both the rail 28 and post 30 further include a plurality of longitudinally spaced apart mounting holes 38 for attaching the seat 22 and furniture 24 directly to the seating mount 26 using suitable fasteners, and in turn indirectly to the pair of seat tracks 18 in the cabin floor 12. In this way, the seating mount 26 supports both the passenger seat, and passenger, and the attendant furniture at several preferentially located attachment points, with the entire seating module 20 being supported in total solely by the underlying pair of seat tracks 18, without an auxiliary support along the cabin sidewall itself.

The mounting post 30, however, extends vertically along that sidewall, and additionally provides one or more specially located and elevated sidewall-level attachment points for carrying furniture loads downwardly into the mounting rail 28 and into the pair of seat tracks 18. While the floor rail 28 extends transversely from the cabin sidewall 14 below the seat 22 and furniture 24, the sidewall post 30 may be located closely adjacent to the cabin sidewall 14, either in front of the sidewall inside the cabin 10a; or in-line or flush with the sidewall; or hidden behind the sidewall, and extends vertically inside the height limits of the seat furniture.

In the exemplary embodiment shown in FIGS. 7 and 8, the mounting rail 28 includes two of the mounting bosses 34 and holes 36, and five of the mounting holes 38; and the mounting post 30 includes two of the mounting holes 38, with one hole 38 being located at the top distal end of the post 38. That post 38 is also thin, narrow, and slender and has a suitable vertical length for positioning the top mounting hole 38 as desired for providing auxiliary support for the specific design of the attendant furniture 24, whether that furniture is short or tall according to the seat module design.

In the two exemplary embodiments shown in FIGS. 3 and 5, the cabin sidewall 14 extends vertically along the Z-axis above the cabin floor 12, and the seat tracks 18 extend parallel with the cabin sidewall along the longitudinal X-axis of the aircraft. The mounting rail 28 is configured to extend transversely from the cabin sidewall 14 along the aircraft Y-axis to align the mounting bosses 34 with the seat tracks 18 for suitable attachment thereto by fasteners.

The mounting post 30 is configured to extend freestanding vertically from the horizontal mounting rail 28 and vertically along the cabin sidewall 14 without attachment thereto as described above. In FIG. 3, the mounting post 30 may be located inside the cabin 10a itself closely adjacent to the inside surface of the sidewall 14. In FIG. 5, the mounting post 30 may be hidden behind the sidewall 14 in the internal space between the sidewall and the outer skin 10b of the aircraft fuselage. The vertical length or height of the mounting posts 30 is selected as required for providing suitable support for the specific design of the attendant seat furniture 24.

As shown in FIG. 6, the mounting rail 28 is configured to extend transversely from the cabin sidewall 14 with a suitable rail floor or seating angle A for inclining the rail in the X-Y floor plane relative to the pair of seat tracks 18 oriented parallel to the longitudinal X-axis of the aircraft. The rail angle A may have a zero value relative to the transverse Y-axis to orient the rail 28 perpendicular, or 90 degrees, to the sidewall 14. The rail angle A may also range up to about 50 degrees toward the front of the aircraft cabin. Since the two seat tracks 18 are parallel to the sidewall 14, and spaced transversely therefrom, and the mounting post 30 is preferably mounted as close as possible to the sidewall, the length of the rail 28 must necessarily increase to overlap both tracks 18 as the rail angle A increases between zero degrees (perpendicular) to the exemplary 50 degrees maximum.

Furthermore, the rail angle A is primarily controlled by the specific geometric design of the seating module 20 and its desired orientation in the passenger cabin, as the seating mount 26 is preferably integrated and hidden within the module while providing suitable mounting points for carrying the operational loads. The mounting bosses 34 therefore have suitable sizes, positions, and spacing in the mounting rail 28 which will change relative to the rail's floor angle A for correspondingly aligning the individual bosses with the pair of seat tracks 18 for direct attachment thereto with corresponding fasteners.

As indicated above, the seating mount 26 is a new feature or member for otherwise conventional aircraft seating pods which can be specially integrated therein for enhancing the structural rigidity and strength thereof for being mounted solely on the conventional pair of seat tracks. The seating mount 26 is sized and configured as small as practical, and with minimal added weight for structurally enhancing the seating module 20 for floor-mounting alone, which in turn may allow for a reduction in size and weight of the combined seating module itself, especially from the additional elevation mounting of the attendant furniture 24 along the vertical mounting post 30, thusly providing a synergistic improvement in pod design, with reduced combined weight.

FIGS. 7 and 8 illustrate the basic design of the seating mount 26 including its vertical post 30 extending upwardly from the horizontal rail 28 in a unitary structure providing directional and special rigidity and strength as required for its special integration into the desired seating module 20.

The desired strength for the seating mount 26 begins with analysis of the weight of the passenger as restrained in the passenger seat 22, weight of the seat 22 itself, and the weight of the attendant furniture 24. These various weights and locations in the module must be carried solely and directly into the two supporting seat tracks 18, without auxiliary support by the cabin sidewall 14 and associated fuselage structure.

These weights are expressed as corresponding loads which can be preferentially carried entirely in whole by the special seating mount 26, or in less-than-whole part if desired. The horizontal mounting rail 28 is located below or preferably at the base of the module and directly atop the cabin floor and seat tracks 18 therein. The vertical post 30 extends upwardly from the proximal end of the rail 28 closely adjacent to the cabin sidewall 14, and is cantilevered therefrom for freestanding support solely by its junction with the proximal end of the rail, yet again, without any load-bearing structural attachment to the cabin sidewall.

The vertical post 30 is suitably fastened to one or more elevated attachment points in the furniture as desired according to module design to carry operational loads therefrom. Those loads applied to the post 30 can be along any of the three X,Y,Z axes of the aircraft. Note in particular that since the post 30 is cantilevered from the rail, additional torque or torsion loads will be applied to the rail from the transverse loads carried by the post along the X and Y axes, with the longitudinal X-load on the post 30 creating torsion loads around the longitudinal axis (e.g. Y-axis) of the rail 28 itself.

Accordingly, the rail 28, post 30, and joining elbow 32 therebetween must be preferentially configured and designed with suitable strength and rigidity, and minimal size and weight, for withstanding the loads carried therethrough during aircraft operation, including the 16 g crash-event loads.

The seating mount 26 may therefore be manufactured from any suitable material including high-strength metal or fiber-reinforced composites, and custom designed for withstanding the specific loads carried therethrough as integrated into the seating module.

Accordingly, the specific configuration, shape, size, length, width, height, thickness, and material composition can be preferentially selected for each design application as required by local geometry and loadpaths; subject, however, to the basic L-shaped configuration of the exemplary seating mount 26 shown in FIGS. 7 and 8.

FIGS. 9-12 show additional features of the seating mount 26 in accordance with a preferred embodiment that maximizes rigidity and strength, while minimizing weight for an exemplary seating module. In view of the torsional loads created by the vertical mounting post 30, both the post 30 and mounting rail 28 preferably vary in cross-sectional configuration adjacent to the adjoining elbow 32 for increasing torsional strength of the seating mount for carrying applied loads from the vertical post 30 into the horizontal rail 30 and in turn into the seat tracks 18.

Away from the elbow 32, the rail 28 and post 30 may be relatively thin, whereas as they approach the elbow 32 the configurations thereof may increase in size for increasing strength and rigidity, especially at the transition elbow 32 which must be sufficiently strong to withstand without damage the maximum, eg 16 g crash-event, loads transferred from the post into the rail, and in turn into the seat tracks 18.

Figures 9, 10:
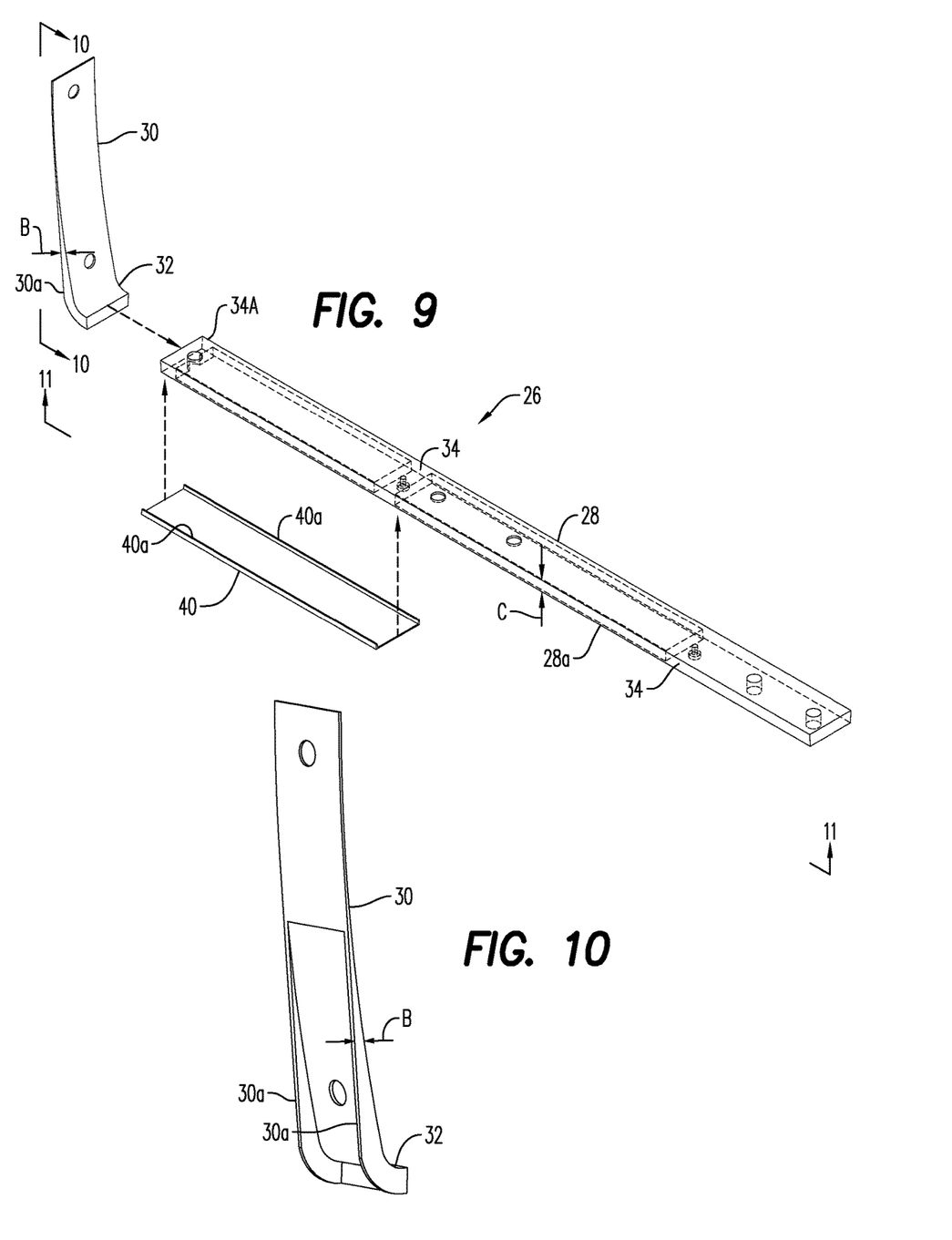
FIG. 9 is an isometric exploded view of the seating mount shown in FIG. 7, including a vertical mounting post affixed at an elbow to a horizontal mounting rail, with the elbow end of the rail enclosed by a cover in an exemplary assembly.
FIG. 10 is an isometric back view of the mounting post and elbow shown in FIG. 9 and taken along line 10-10.

As best shown in FIG. 10, the mounting post 30 preferably increases in thickness B from its distal top end to its proximal bottom end at the elbow 32, having maximum thickness. Correspondingly, the mounting rail 28 shown in FIGS. 11 and 12 has generally uniform thickness C over its full length, but has a greater localized structural strength and rigidity, including in particular torsional strength and rigidity, at a proximal end portion adjacent the elbow 32 than at an opposite distal end portion.

Figures 11, 12:
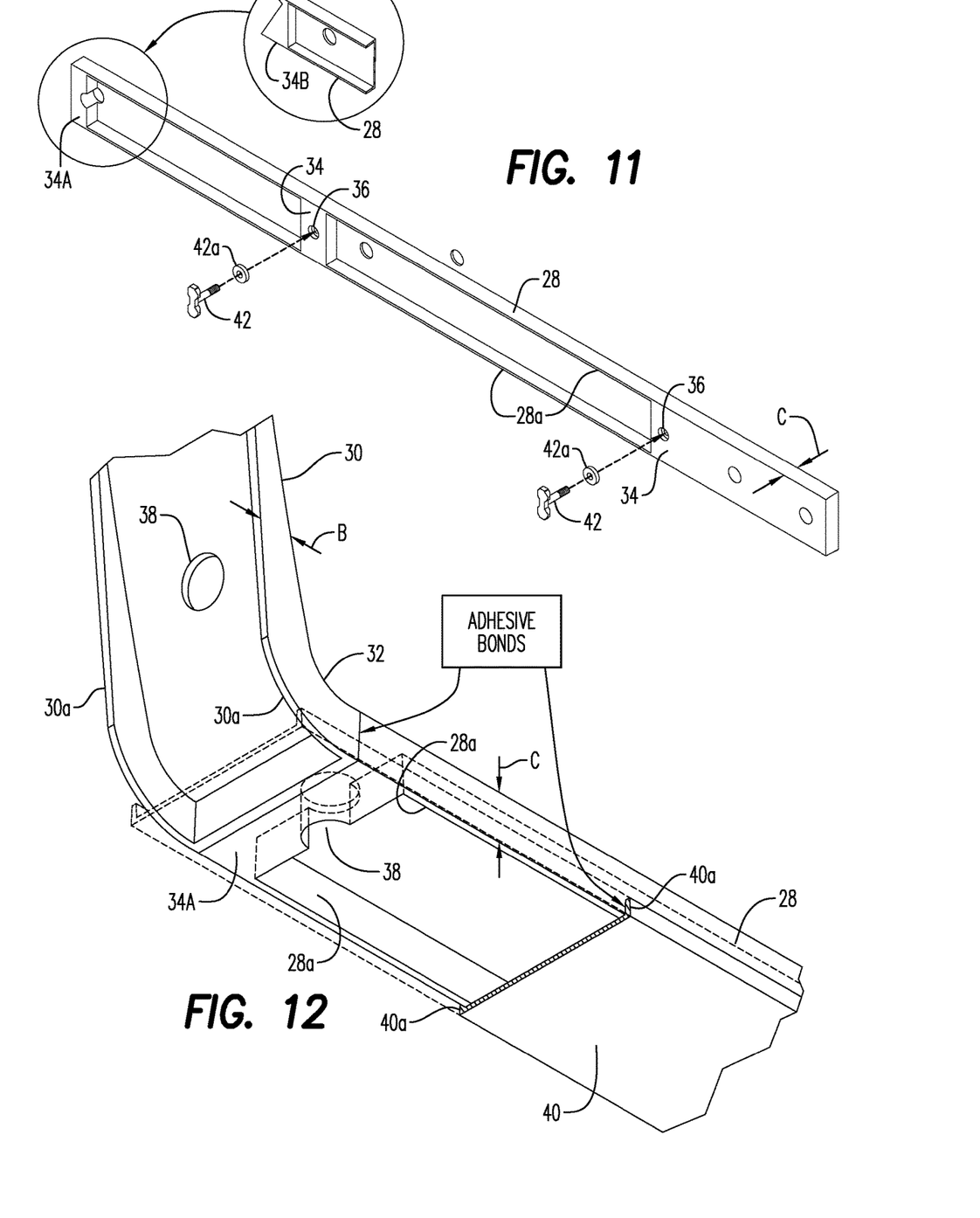
FIG. 11 is an isometric bottom view of the mounting rail shown in FIG. 9 and taken along line 11-11.
FIG. 12 is an isometric back view of the elbow joint at the vertical post and horizontal rail shown in FIG. 7 and taken along line 12-12.
Figure 13:
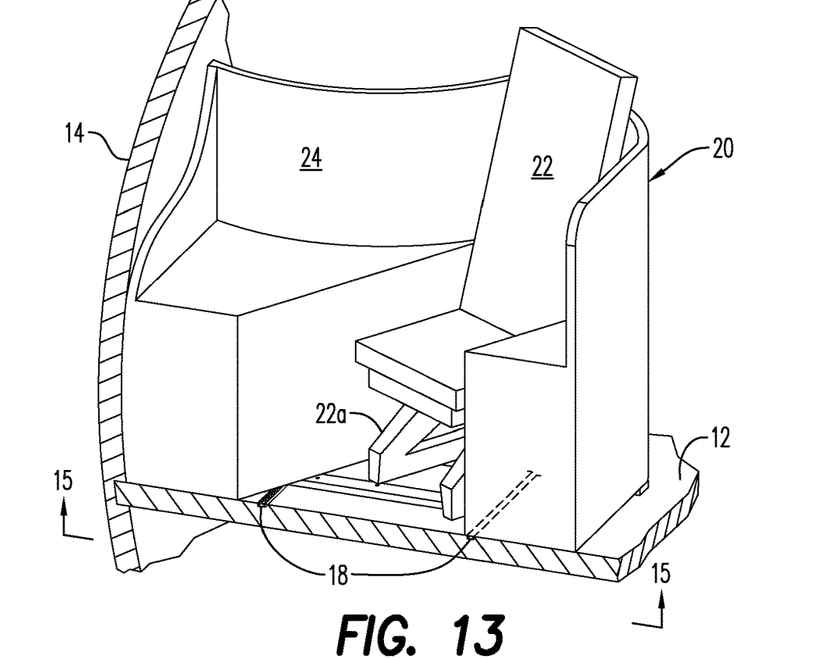
FIG. 13 is a front elevational view of a seating module in accordance with another embodiment, similar to that shown in FIGS. 1 and 2, but having a different embodiment of the seating mounts shown in FIG. 5.
Figure 14:
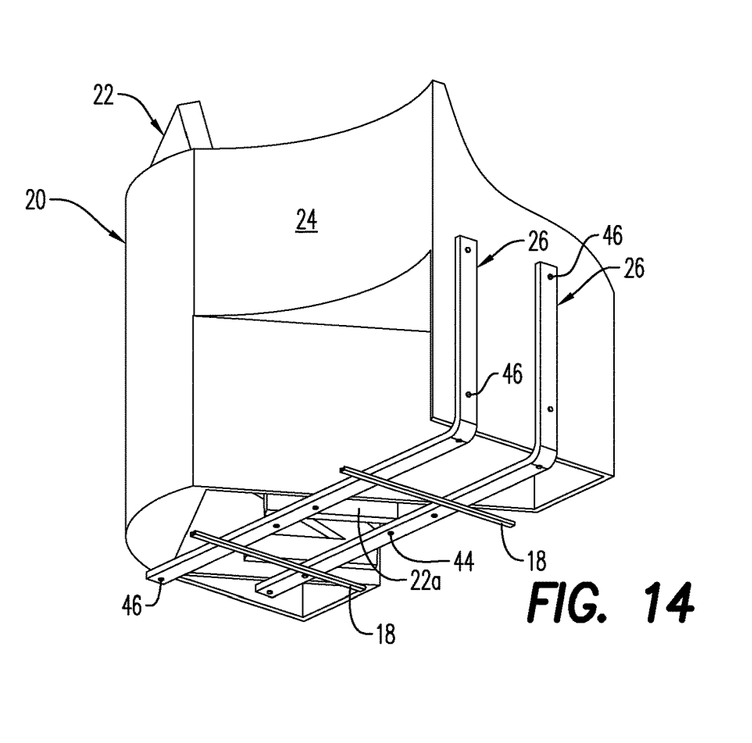
FIG. 14 is a back elevational view of the seating module shown in FIG. 13.

For example, FIGS. 9 and 12 illustrate an exemplary truncated cover plate 40 having a pair of integral sidewall flanges 40a to form a U-shaped channel affixed to the mounting rail adjacent the elbow to collectively form a box-shaped cross section thereat. The cover plate 40 has a suitable length extending from the elbow 32 to about the middle mounting boss 34 and is suitably affixed or adhesively bonded to the underside of the rail 28 for locally increasing strength and rigidity, including torsional strength and rigidity, for better carrying torsion loads from the vertical post 30 into the horizontal rail 28. The rail 28 has a uniform U-shaped cross section over its entire length, with a corresponding structural moment-of-inertia, which is substantially increased locally by the addition of the cover plate 40, and the resulting box-structure increases structural moment-of-inertia and torsional strength and rigidity.

The mounting post 30 shown in FIG. 10 is in the preferred form of a thin vertical plate having an integral pair of adjoining sidewall flanges 30a increasing in height or thickness B downwardly between the opposite distal and proximal ends thereof to form a U-shaped channel adjacent the elbow 32. The top portion of the post 30 has minimal thickness B, while the lower portion has the increasing thickness B along the sidewall flanges 30a which define local gussets that substantially increasing strength and rigidity for carrying loads through the elbow 32. That elbow may be fully solid with thickness matching the flanges 30a, or those flanges 30a may continue into an otherwise thin-plate elbow, with its joining end with the rail being locally solid.

The mounting rail 28 shown in FIG. 9 is also in the preferred form of a thin horizontal plate also having an integral pair of adjoining sidewall flanges 28a extending over its full length between the opposite proximal and distal ends thereof to form a U-shaped channel between the preferentially localized solid portions defining the mounting bosses 34. The outboard flanges 28a define the maximum thickness C of the rail, which is sufficiently larger than the minimum thickness C of the rail in the inboard thin plate between the flanges 28a.

The sidewall mounting post 30 shown in FIGS. 3, 5, & 9 is generally curved to match the curved cabin sidewall, with the perpendicular side flanges 30a forming gussets on the underside thereof which taper and increase in height from top to bottom where they are largest to increase bending and torsion strength at the elbow 32.

The floor rail 28 is generally flat, with the perpendicular side flanges 28a forming gussets on the underside thereof for increasing bending and torsion strength. The proximal end of the rail 28 includes another locally enlarged mounting or anchoring boss 34A, which is preferably fully solid to provide an attachment boss with a bond face matching the mating face of the elbow 32 as shown in FIGS. 9 and 12 for adhesively bonding together the post 30 and rail 28 into an integrated or unitary assembly.

In FIGS. 9 and 12, the transition elbow 32 at the bottom end of the sidewall post 30 has a flat bonding face which is generally parallel with the vertical face of the post thereabove, and matches in size and area the corresponding flat bonding face of the proximal end of the floor rail 28, with the opposing flat faces being bonded together by a suitable adhesive.

FIG. 12 also illustrates that the cover plate 40 preferably encloses the bottom of the floor rail 28 and overlaps or overhangs the transition elbow 32 to collectively define with the elbow flanges 30a a multi-gusset or multi-brace junction for providing increased mechanical strength to the adhesively bonded junction of the elbow 32 and rail 28.

This embodiment of the seating mount 26 shown in FIG. 7 in its integrated or unitary configuration is generally straight or linear in its vertical L-shaped profile and symmetrical about a common longitudinal axis, with the two bonding faces between the elbow 32 and rail 28 being perpendicular to that common axis. This seating mount 26 may be installed atop the two seat tracks 18 shown in FIGS. 5 and 6 perpendicular or normal to the cabin sidewall 14 with a zero rail angle A relative to the transverse Y-axis.

In alternate embodiments, this same linear seating mount 26 could be transversely inclined at any suitable rail angle A shown schematically in FIG. 6, with the vertical post 30 either being parallel to the cabin sidewall 14, or angled obliquely therefrom. For example, the linear version of the seating mount 26 shown in FIG. 7 is also shown as one alternative to the right in FIG. 6 in which the post 30 would have the same rail angle A as the rail 28 itself. FIGS. 3, 4, 5, 14, 15, and 16 show exemplary configurations of the seating module using this linear form of the seating mount.

An oblique version of the seating mount 26 is shown in part in FIG. 11, in which the anchoring boss 34B instead of having a perpendicular bond face, like anchoring boss version 34A, is slightly modified to have a bond face locally inclined at the desired rail angle A to thereby position the rail 28 at the same rail angle A, while the adjoining post 30 remains parallel to the cabin sidewall 14. This oblique version of the seating mount 26 is shown at the left in FIG. 6, and effects an L-shaped mount in which the post 30 is no longer linearly aligned with the longitudinal axis of the rail, but is oblique or offset therefrom to maintain its parallel orientation with the cabin sidewall 14 and seat tracks 18.

Since the basic seating mount 26 has a generally L-shaped vertical configuration between the horizontal rail 28 and the vertical post 30, that rail 28 and post 30 can have any suitable configuration as best needed to match the corresponding mounting locations within the seating module itself for preferentially supporting the seat and attendant furniture. The rail 28 and post 30 can be custom designed as desired for providing sufficient strength for withstanding the design-specification operating loads while having any suitable shape for being mounted to the conventional seat tracks 18, and available mounting portions of the attendant furniture.

Although the seating mount 26 may be made from high-strength metal, it is preferred that it be made entirely from high-strength composite materials, such as resin impregnated carbon fibers, suitably thermally cured for achieving high strength with minimal weight and minimal thickness. The use of composite materials allows custom-design manufacturing by various conventional methods, including molds or dies to define the corresponding shapes thereof.

In the preferred three-part configuration of the floor rail 28, sidewall post 30, and lower cover plate 40, each of these components can be separately tailor-molded for maximizing strength while minimizing weight, and then suitably assembled and bonded together into an integral or unitary assembly having enhanced bending and torsional strength. A suitable bonding adhesive for integrally joining these components is an epoxy adhesive such as, for example, commercially available Magnobond 6166, but any suitable bonding method may otherwise be used to form the seating mount 26 preferably as a unitary and integrated structural frame member.

The molding dies may be modified to in turn modify the configuration, length, and height of the components of the seating mount 26 for different aircraft seating configurations. And, the elbow 32 may be further tailored to control the angular orientation of the sidewall post 30 relative to the floor rail 28 as that floor rail 28 varies in angular orientation relative to the longitudinal seat tracks 18 in accordance with different seat designs.

In FIG. 7 the plurality of mounting holes 38 are spaced apart longitudinally along both the vertical mounting post plate 30 and along the horizontal mounting rail plate 28, and each of the mounting bosses 34 is integrally joined to the horizontal mounting plate 28 inside the U-shaped channel and integral with the adjoining sidewall flanges 28a. Molding of carbon fibers can readily provide the locally enlarged bosses 34 suitably spaced along the relatively thin-plate rail 28 shown in FIG. 11, with the mounting bosses at both proximal and distal ends, and the middle boss spaced longitudinally therebetween.

The anchoring boss 34A at the proximal end of the rail 28 is preferably solid for providing the matching bonding face with the elbow 32, shown in FIG. 9. The remaining two mounting bosses 34 preferably include a blind threaded hole 36 facing downwardly for receiving corresponding threaded floor fasteners 42 for affixing the mounting rail 28 to the two seat tracks 18 as shown in FIG. 11.

Accordingly, the seating mount 26 described above provides a basic or fundamentally new Seat Attachment FramE (SAFE) that may vary greatly in configuration to complement the various designs of aircraft seats for improving the mounting thereof to the conventional seat tracks 18, without secondary attachment and support from the cabin sidewall.

In a basic combination, the seating module 20 firstly includes the aircraft seat 22 fixedly joined to the seating mount 26 at the mounting rail 28, along with any attendant furniture 24 that requires support. That furniture in any suitable form is fixedly joined to the seating mount 26 preferably at both the mounting post 30 and the mounting rail 28.

The collective combination of seat 22, furniture 24, and mount 26 are therefore integrated together with interconnected loadpaths, which enhances the structural integrity thereof, and allows mounting or support solely on the cabin floor at the provided seat tracks 18.

In the embodiment shown in FIGS. 1-4, each seating module 20 includes a single seating mount 26 at an oblique rail angle A from the cabin sidewall 14. Note that this seating mount may even extend between two seating modules 20 along the aisle, and suitably affixed thereto as desired.

FIGS. 13-16 illustrate another embodiment of the seating modules 20 in which a pair of the seating mounts 26 are integrated in each module, with each mount 26 including respective ones of the mounting rails 28 with respective pairs of the mounting bosses 34. The aircraft seat 22 is fixedly joined to the pair of mounting rails 28, and the attendant furniture 24 is fixedly joined to both the pair of mounting posts 30 and to the pair of mounting rails 28.

Figure 15:
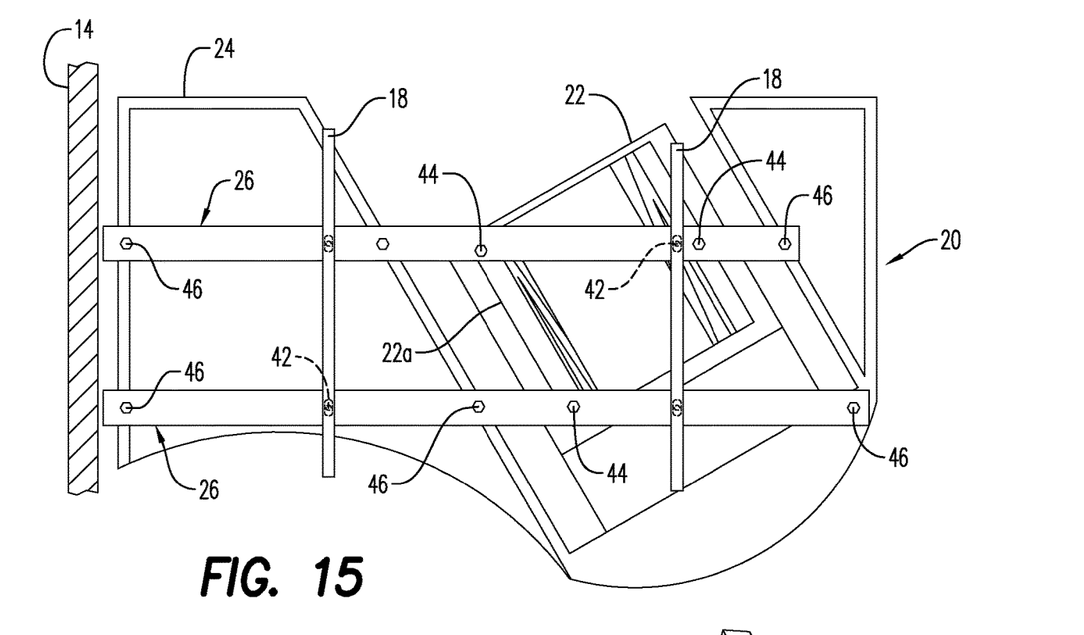
FIG. 15 is a bottom view of the seating module shown in FIG. 13 and taken along line 15-15.

FIG. 15 shows that the two seating mounts 26 may be disposed perpendicular to the sidewall 14 without oblique inclination, with the seat 22 instead being rotated obliquely to face the sidewall 14, or angled to face the aisle, at a suitable seat angle for enhancing privacy within the surrounding furniture privacy wall 24.

Figure 16:
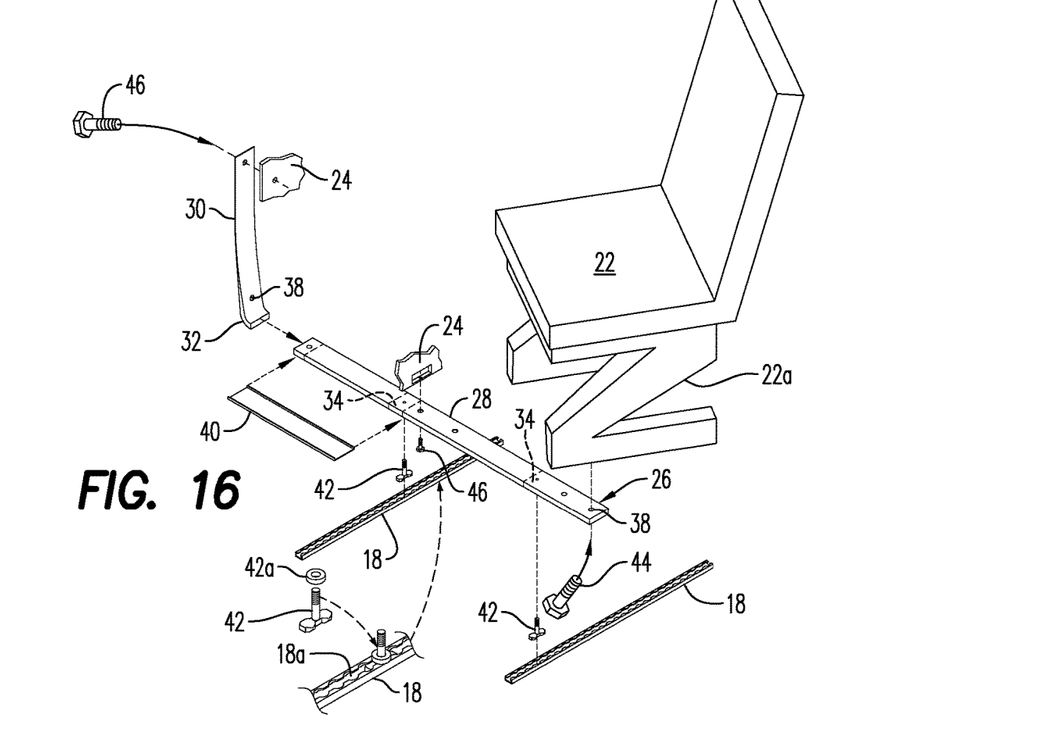
FIG. 16 is an exploded isometric view of the seating mount embodiment introduced in FIG. 7 as configured for use in the seating module introduced in FIG. 13.

Conventionally, the seat 22 would be affixed directly to the seat tracks 18, however, in the improved seating module 20, the seat 22 is instead affixed to the seating mount 26 by a suitable seat bolt or fastener 44 extending through one of the mounting holes 38 in the mounting rail 26. Several seat fasteners 44 may be used as desired to affix the seat to the two seating mounts 26.

The furniture 24 is also affixed to the seating mount 26 by corresponding furniture bolts or fasteners 46 extending through different ones of the mounting holes 38 in both the rail 28 and post 30 at different locations in the furniture as the design permits. The seat 22 and furniture 24 so affixed to the two seating mounts 26 define a freestanding collective seating pod mountable to the cabin floor 12 by the floor fasteners 42 joining the mounting bosses 34 to the seat tracks 18.

FIGS. 15 and 16 also illustrates different locations of the different mounting holes 38 by the locations of the corresponding fasteners 46, and of the different mounting bosses 34 by the locations of the seat fasteners 44.

In this embodiment, the seat 22 is affixed obliquely upon the pair of seating mounts 26, and the seating mounts 26 have different configurations to differently support correspondingly different portions of the seat and furniture affixed thereto.

The furniture 24 may be disposed on both sides of the seat 22, and the mounting rails 28 extend laterally across the seat, with the furniture 24 affixed to the mounting rails 28 at both sides of the seat.

The pattern of mounting holes 38 and threaded bosses 34 will be determined by the specific orientation of the seating mounts 26 relative to the cabin sidewall and relative to the supported seat and furniture atop those mounts 26, and FIG. 15 shows that those patterns can be different for the two seating mounts 26 used in the common seating module. The forward mounting rail 26 is shorter than the back mounting rail 26 in this embodiment, with the forward rail having five mounting holes 38 for affixing the seat and furniture with the fasteners 44,46, and the longer back mounting rail 26 having four mounting holes 38 for fasteners 44,46, with both rails having two-each bosses 34 for the floor fasteners 42.

Note that the oblique seat is supported by only three fasteners 44, with two fasteners 46 on the forward rail 28 and one fastener 46 on the aft rail 26 due to this special geometric layout between the seat legs and parallel seat tracks 18. The seat right leg 22a (closer to the cabin sidewall) has two seat fasteners 44 at both front and back ends of the seat, whereas the seat left leg 22a has a single seat fastener 44 between the front and back ends of the seat.

Depending upon the layout of the two seat legs 22a atop the two mounting rails 28 atop the two seat tracks 18, any suitable attachment of the seat to the seat tracks may be provided, preferably indirectly through one or more of the mounting rails themselves for most, if not all, seat fasteners as illustrated; or even directly at any one or more locations as desired wherein alignment permits (not shown).

FIG. 4 shows that a single seating mount 26 can be used in a single seating module 20, which seating mount 26 might possibly extend to the next seating module, yet again as dictated by the specific design and orientation of the seats and seating modules in the cabin layout, and as dictated by the size and orientation of the mounting rail 28 relative to the supporting seat legs.

The basic seating mount 26 therefore provides substantial flexibility in design for use in mounting passenger seats in the aircraft cabin, subject to the varying designs of the seats themselves, and any attendant furniture, regardless of size and complexity.

Quite significant for the seating mount 26 design, is its fundamental configuration in size, strength, and weight to support the seat and furniture and withstand operational loads experienced by the seating module 20 during operation in the aircraft, including the 16 g crash event.

With such enhanced strength of the seating module 20 due to the integrated seating mount 26, the attendant furniture 24 may be configured for correspondingly reduced weight as it is now being supported by the special seating mount 26 instead of being supported directly by the cabin floor for the operational loads experienced by the seating module during operation in the aircraft.

The furniture 24 includes the partition wall bounding the seat 22 and is affixed in part to the vertical mounting post 30 which permits freestanding the furniture atop the seating mount 26 without attachment to the cabin sidewall, or any support therefrom.

The furniture 24 can now be re-designed to be thinner, taller, closer to the cabin sidewall, and lighter in weight due to its additional support along the vertical mounting post 30, thusly providing a synergistic improvement in strength, and possibly reduced weight of the resulting seating module 20.

By affixing the seat 22 and furniture 24 to the seating mount 26, the collective seating pod or module 20 becomes freestanding, and is mountable to the cabin floor solely by the floor fasteners 42 joining the mounting bosses 34 to the seat tracks 18 in the preferred embodiment.

The seat 22 itself is affixed to the pair of seating mounts 26 by the corresponding seat fasteners 44 extending through the mounting holes 38 in the mounting rails 28. And, the furniture 24 is affixed to the pair of seating mounts 26 by the corresponding furniture fasteners 46 extending through different ones of the mounting holes 38 in both the rail 28 and post 30.

As shown in FIGS. 15 and 16, the seating mounts 26 are parallel to each other and spaced apart at front and back ends of the seat 22, and the seat 22 includes a pair of legs 22a spaced apart across the width of the seat. The legs 22a may have any conventional configuration, and typically have holes for receiving the conventional T-shaped double-lug stud fastener which would otherwise be affixed in the conventional keyhole slots of the seat tracks.

Contrary to this conventional mounting of the seats directly to the seat tracks 18, the seat legs 20a are instead affixed to the mounting rails 28 by the simple seat bolts or fasteners 44 preferably at both the front and back ends of the seat.

Since the mounting rails 28 are being directly affixed to the conventional seat tracks 18 attached to the cabin floor, those rails can be mounted using conventional floor fasteners, like the exemplary T-shaped floor fasteners 42 shown in FIG. 16. The seat tracks 18 extend longitudinally along the cabin floorboards in the typical form of L-shaped aircraft tracks, and flush therewith, and include a row of keyhole slots 18a configured for receiving the exemplary double-lug, or T-shaped, threaded stud fitting or floor fastener 42.

The threaded stud end of the floor fastener 42 is pre-threaded into the threaded hole 36 of the mounting boss 34 (see FIG. 11), with a corresponding circular washer or plunger washer 42a also mounted loosely on the stud. The double-lug end of this floor fastener 42 is then inserted into one of the keyhole slots 18a and slid halfway between two keyhole slots for retention under corresponding flanges, and then secured thereat by the plunger washer 42a sized to fit the mating seat between adjacent keyhole slots.

Since each mounting rail 28 has two mounting bosses and attached floor fasteners 42, each rail 28 may be manually positioned over the two seat tracks 18 to simultaneously engage the double-lugs in corresponding keyhole slots, and then slid into final position at which the corresponding plunger washers 42a drop into their retention seats in the tracks for affixing each rail 28 vertically, longitudinally, and transversely against all movement.

FIG. 16 shows one floor fastener 42 as it enters one keyhole slot 18a, with its cooperating washer 42a shown above, and another fastener 42 locked halfway between two adjacent keyhole slots by the washer 42a resting in its retention socket. Of course, in this embodiment the threaded ends of the fasteners 42 are first threaded into the mounting bosses. However, other designs for the floor fasteners may be used in which a cooperating nut could be mounted on the stud threads in a fastener design protruding upwardly through the rail 28.

The novel seating mount 26 provides an internal frame in the otherwise conventional seating pod or module 20 and provides substantial improvements thereto for being freestanding supported atop the cabin floor, without sidewall attachments. In a novel method of making the improved aircraft seating module 20, both the aircraft seat and attendant furniture are mounted to a common seating mount, and then the seat, furniture, and seating mount are collectively mounted to the pair of seat tracks in the aircraft cabin floor without attachment to the aircraft cabin sidewall.

Design of a conventional seating pod requires that both the seat and attendant furniture are sized with sufficient strength for being attached to the aircraft seat tracks, and will therefore have substantial weight which must be safely carried during aircraft operation, including the 16 g crash-event requirement.

However, by incorporating the new SAFE seating mount 26 into a seating pod design, that seating mount 26 is first attached to the seat tracks, and then the seat 22 and attendant furniture 24 may then be attached to that mount, with that mount providing a new structural element in the pod for carrying the operating loads, which are transferred by the mount into the seat tracks, without any attachment to the cabin sidewall.

Since the seating mount 26 thusly reinforces the seating pod, various features of that pod may now be re-designed for reducing size and strength of those features corresponding to the increased strength provided by the seating mount. Collectively then, the improved seat, furniture, and seating mount provide integrated strength sufficient for carrying the intended operating loads into the seat tracks, with the ability to further reduce collective weight of the pod. Reduced pod weight has the synergistic effect of allowing a reduction in size, strength, and weight of the seating mount itself.

Each seating pod can have one or two seating mounts, as desired, and the seat and furniture may be attached in whole to that one or two mounts, or may otherwise be additionally mounted to the seat tracks in multiple loadpaths thereto as desired.

The seating pod with its integrated seating mount may be designed to be installed as a collective unit to the seat tracks, or may be designed for assembly in multiple pieces attached in turn to the seat tracks.

The SAFE technology provides many advantages in design including structural support or internal bracing in both the transverse Y-axis, at the floor level, and the vertical Z-axis, through a vertical post or arm that may then extend through the cabin sidewall while only utilizing the seat tracks to join to the airframe.

Additionally, its construction from compression molded carbon fiber enables modular tooling that can be adapted for specific configurations (length, width, height, angles) to provide flexibility for customers, such as seating providers and airlines.

SAFE Technology aims to reduce current design constraints, and provide design flexibility to optimize the seating product for single-aisle aircraft, although its application on twin-aisle aircraft is also suitable.

Some unique aspects of SAFE Technology include its preferred composite structure for being lightweight, strong, fast manufacturing, and minimum processing steps. SAFE features also include vertical and horizontal structural support; horizontal stiffness achieved through the floor rail or arm that runs along the existing floorboards and attaches through the conventional seat track system. Vertical stiffness is provided by the vertical sidewall post or arm running along the inside or behind the cabin sidewall and providing anchor points for the upper portion of the seat furniture.

The SAFE seating mount can be designed to withstand the loading anticipated by the furniture under standard 16 G test conditions. The attachment points along the sidewall post provide new anchor points for seat furniture that enable seat furniture improvements including thinner structures, higher seating density, lighter weight structures, taller structures, more privacy, more space for In Flight Entertainment (IFE) screens, closer proximity to cabin sidewall, wider aisles, larger seat pitch, compatibility with existing seat tracks.

SAFE technology does not require special modification of the aircraft floorboards which are often considered structural elements of the airframe. The horizontal floor rail or arm is compatible with the standard seat track attachment system and is applicable to any aircraft platform which utilizes current seat track hardware.

Flexible geometric design envelope provided by SAFE Technology is adaptable to specific seat designs without the need for major tooling modifications or design changes. Adjustable vertical post or arm height allows variable anchor points along the cabin sidewall to support seat furniture walls of varying heights, without any anchoring attachments to the cabin sidewall itself.

Adjustable horizontal floor rail or arm length allows variable seat attachment in relationship to the cabin sidewall and aisle. Adjustable angle of horizontal floor rail or arm allows for variable seat attachment forward or aft in the aircraft. Compatible with forward facing or aft facing or side facing seating concepts. Seat track attachment is compliant with certification requirements.

SAFE Technology uniquely provides cabin sidewall-level attachments for seating products, without anchoring to the cabin sidewall itself. The SAFE solution combines careful geometric design and material selection to allow for the seating adapter or mount design to fit anywhere along the seat tracks. The adapter is designed to allow lower attachments anywhere along its length. The adapter is also designed to have upper sidewall-level attachments, either behind, integrated, or in front, of the aircraft cabin sidewall at any height, preferably below the window.

The adapter is designed to take the forces applied at the vertical sidewall post attachments and transfer them into the seat tracks. The seat adapter itself is an distinct product used to attach an aircraft seat to the airframe of the aircraft. The unique geometry provides attachment locations along the floor, utilizing standard hardware and seat tracks, and upwardly along the cabin sidewall which provides additional support for furniture not currently offered by any other solution on the market.

The seat adapter therefore provides an internal structural frame for the seat module that integrates the seat and attendant furniture with a common frame for carrying all loads experienced during flight operation through the adapter and into the conventional airframe seat tracks. The sidewall post may extend vertically upwardly from the floor rail within the available height of the seat module for providing additional anchor points for the furniture to carry loads therefrom downwardly through the sidewall post and along the floor rail into the seat tracks, without requiring any anchor points in the cabin sidewall itself.

The improved seat module may therefore be designed as a stand-alone component requiring mounting only to the conventional seat tracks. And since the internal seat adapter provides enhanced strength to the seat module, the various components of that module, especially the attendant furniture, may be made thinner and lighter in weight, with the correspondingly reduced loads therefrom being suitably carried in whole or in part by the seat adapter, instead of solely by that attendant furniture itself.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. An aircraft seating module (20) configured for supporting an aircraft passenger seat (22) and furniture (24) solely on a seat track (18) in a floor (12) of an aircraft cabin (10a) without attachment to a cabin sidewall (14) surrounding the floor (12), and comprising:
    a seating mount (26) including a horizontal mounting rail (28) integrally joined to a freestanding vertical mounting post (30) at an adjoining elbow (32);
    said rail (28) including a mounting boss (34) longitudinally spaced from said post (30) for attachment to said seat track (18); and
    both said rail (28) and post (30) include a plurality of longitudinally spaced apart mounting holes (38) for attaching said seat (22) and furniture (24) directly to said seating mount (26) and in turn indirectly to said seat track (18) in said cabin floor (12) for supporting said seating module in total solely by said seat track in said cabin floor without attachment to said surrounding cabin sidewall (14).

2. A seating module according to claim 1 wherein said cabin sidewall (14) extends vertically above said cabin floor (12), and said seat track (18) extends parallel with said cabin sidewall (14), and wherein:
    said mounting post (30) is configured to extend freestanding vertically from said mounting rail (28) and vertically along said cabin sidewall (14) without attachment thereto; and
    said mounting rail (28) is configured to extend transversely from said cabin sidewall (14) to align said mounting boss (34) with said seat track (18) for attachment thereto.

3. A seating module according to claim 2 wherein said aircraft cabin includes a pair of said seat tracks (18) affixed to said cabin floor (12), and wherein said mounting rail (28) includes a pair of said mounting bosses (34) spaced apart for corresponding alignment with said pair of seat tracks (18) for corresponding attachment thereto.

4. A seating module according to claim 3 wherein said mounting rail (28) is configured to extend transversely from said cabin sidewall (14) with a rail angle (A) ranging from perpendicular to said sidewall (14) to an acute angle therewith, and includes corresponding positions and spacing of said mounting bosses (34) for corresponding alignment with said pair of seat tracks (18).

5. A seating module according to claim 2 wherein both said mounting post (30) and mounting rail (28) vary in cross-sectional configuration adjacent to said adjoining elbow (32) for increasing torsional strength of said seating mount (26) for carrying applied loads from said vertical post (30) into said horizontal rail (28) and in turn into said seat track (18).

6. A seating module according to claim 2 wherein:
    said mounting post (30) increases in thickness from a distal top end to a proximal bottom end at said elbow (32); and
    said mounting rail (28) has a greater structural strength at a proximal end portion adjacent said elbow (32) than at an opposite distal end portion.

7. A seating module according to claim 2 wherein:
    said mounting post (30) comprises a vertical plate having a pair of adjoining sidewall flanges (30a) increasing in height downwardly between opposite distal and proximal ends thereof to form a U-shaped channel adjacent said elbow (32); and
    said mounting rail (28) comprises a horizontal plate having a pair of adjoining sidewall flanges (28a) extending between opposite proximal and distal ends thereof to form a U-shaped channel.

8. A seating module according to claim 7 wherein:
    said plurality of mounting holes (38) are spaced apart longitudinally along said vertical plate mounting post (30) and along said horizontal plate mounting rail (28); and
    said mounting boss (34) is integrally joined to said horizontal plate mounting rail (28) inside said U-shaped channel and integral with said adjoining sidewall flanges (28a).

9. A seating module according to claim 8 wherein said mounting boss (34) includes a threaded hole (36) facing downwardly for receiving a threaded fastener (42) for affixing said mounting rail (28) to said seat track (18).

10. A seating module according to claim 7 wherein said seating mount (26) further comprises a cover plate (40) having a pair of sidewall flanges (40a) to form a U-shaped channel affixed to said mounting rail (28) adjacent said elbow (32) to collectively form a box-shaped cross section thereat.

11. A seating module according to claim 3 further comprising:
    said aircraft passenger seat (22) being fixedly joined to said seating mount (26) at said mounting rail (28); and
    said furniture (24) being fixedly joined to said seating mount (26) at both said mounting post (30) and said mounting rail (28).

12. A seating module according to claim 11 wherein:
    said seat (22) is affixed to said seating mount (26) by a seat fastener (44) extending through one of said mounting holes (38) in said mounting rail (28);
    said furniture (24) is affixed to said seating mount (26) by corresponding furniture fasteners (46) extending through different ones of said mounting holes (38); and
    said seat (22) and furniture (24) affixed to said seating mount (26) define a freestanding collective seating pod mountable to said cabin floor (12) by floor fasteners (42) joining said mounting bosses (34) to said seat tracks (18).

13. A seating module according to claim 12 wherein:
said seating mount (26) is configured in size, strength, and weight to support said seat (22) and furniture (24) and withstand operational loads experienced by said seating module (20) during operation in an aircraft; and
said furniture (24) is configured for correspondingly reduced weight for being supported by said seating mount (26) instead of being supported directly by said cabin floor (12) for said operational loads experienced by said seating module (20) during operation in said aircraft.

14. A seating module according to claim 12 wherein said furniture (24) includes a partition wall bounding said seat (22) and affixed to said mounting post (30) for freestanding said furniture (24) atop said seating mount (26) without attachment to said cabin sidewall (14).

15. A seating module according to claim 3 further comprising:
a pair of said seating mounts (26) each including respective ones of said mounting rails (28) with respective pairs of said mounting bosses (34);
said aircraft seat (22) being fixedly joined to said pair of mounting rails (28); and
said furniture (24) being fixedly joined to said pair of mounting posts (30) and to said pair of mounting rails (28).

16. A seating module according to claim 15 wherein:
said seat (22) is affixed to said pair of seating mounts (26) by corresponding seat fasteners (44) extending through said mounting holes (38) in said mounting rails (28);
said furniture (24) is affixed to said pair of seating mounts (26) by corresponding furniture fasteners (46) extending through different ones of said mounting holes (38); and
said seat (22) and furniture (24) affixed to said seating mounts (26) define a freestanding collective seating pod mountable to said cabin floor (12) by floor fasteners (42) joining said mounting bosses (34) to said seat tracks (18).

17. A seating module according to claim 16 wherein:
said seating mounts (26) are parallel to each other and spaced apart at front and back ends of said seat (22);
said seat (22) includes a pair of legs (22a) spaced apart across the width thereof; and
said seat legs (22a) are affixed to said mounting rails (28) by said seat fasteners (44) at both said front and back ends of said seat (22).

18. A seating module according to claim 16 wherein:
said seat (22) is affixed obliquely upon said pair of seating mounts (26); and
said seating mounts (26) have different configurations to differently support correspondingly different portions of said seat (22) and furniture (24) affixed thereto.

19. A seating module according to claim 18 wherein:
said furniture (24) is disposed on both sides of said seat (22); and
said mounting rails (28) extend laterally across said seat (22), with said furniture (24) affixed to said mounting rails (28) at both sides of said seat (22).

20. A method of making said aircraft seating module (20) according to claim 2 comprising:
mounting both said aircraft seat (22) and said furniture (24) to said seating mount (26); and
mounting said seat (22), furniture (24), and seating mount (26) collectively to said seat track (18) in said aircraft cabin floor (12) without attachment to said aircraft cabin sidewall (14).

* * * * *